US012790239B2

(12) United States Patent
Zhou et al.

(10) Patent No.: US 12,790,239 B2
(45) Date of Patent: Nov. 10, 2026

(54) DESALINATION METHOD OF ION MICRO-NANO SIEVING FOR AGRICULTURAL WATER

(71) Applicant: Zhejiang University, Hangzhou City (CN)

(72) Inventors: Jie Zhou, Hangzhou City (CN); Jianjiang Wang, Hangzhou City (CN); Fengjun Yang, Hangzhou City (CN); Jingquan Yu, Hangzhou City (CN); Zhenyu Qi, Hangzhou City (CN); Yanhong Zhou, Hangzhou City (CN); Kai Shi, Hangzhou City (CN); Xiaojian Xia, Hangzhou City (CN); Zhangjian Hu, Hangzhou City (CN)

( * ) Notice: Subject to any disclaimer, the term of this patent is extended or adjusted under 35 U.S.C. 154(b) by 502 days.

(21) Appl. No.: 18/236,199

(22) Filed: Aug. 21, 2023

(65) Prior Publication Data

US 2024/0317611 A1 Sep. 26, 2024

(30) Foreign Application Priority Data

Mar. 24, 2023 (CN) ......................... 202310302717.0

(51) Int. Cl.
*B01D 69/12* (2006.01)
*B01D 69/04* (2006.01)
(Continued)

(52) U.S. Cl.
CPC ............ *C02F 1/265* (2013.01); *B01D 69/043* (2013.01); *B01D 69/12* (2013.01);
(Continued)

(58) Field of Classification Search
CPC ...... B01D 25/00; B01D 25/003; B01D 25/02; B01D 25/12; B01D 25/127; B01D 25/21;
(Continued)

(56) References Cited

U.S. PATENT DOCUMENTS

2002/0179424 A1* 12/2002 Osada ...................... C10G 1/10
201/25
2009/0143227 A1* 6/2009 Dubrow ................ D06M 11/46
502/406

FOREIGN PATENT DOCUMENTS

CN 107473203 12/2017
CN 108043242 5/2018
(Continued)

OTHER PUBLICATIONS

Notification of Grant Patent Right for Invention dated Apr. 21, 2024 in SIPO application No. 202310302717.0.
(Continued)

*Primary Examiner* — Allison G Fitzsimmons
(74) *Attorney, Agent, or Firm* — Daniel M. Cohn; Howard M. Cohn

(57) ABSTRACT

Disclosed is a desalination method of ion micro-nano sieving for agricultural water in the field of water purification. By constructing a desalting membrane with a composite water channel, through the identification of ion diameter and charge, with fluid dynamics and micro-nano flow theory, the targeted passage of water and salt is realized, and cations like sodium, calcium, magnesium, and anions like chlorine, sulfate, bicarbonate in saline-alkali water are effectively removed, which achieves forward hydrodynamic desalination.

7 Claims, 6 Drawing Sheets

(51) Int. Cl.

| | |
|---|---|
| ***B01D 71/02*** | (2006.01) |
| ***C02F 1/26*** | (2023.01) |
| *C02F 101/10* | (2006.01) |
| *C02F 101/30* | (2006.01) |
| *C02F 103/34* | (2006.01) |

(52) U.S. Cl.

CPC ...... *B01D 71/0211* (2022.08); *B01D 71/0212* (2022.08); *B01D 71/0215* (2022.08); *C02F 2101/10* (2013.01); *C02F 2101/30* (2013.01); *C02F 2103/34* (2013.01); *C02F 2305/08* (2013.01)

(58) Field of Classification Search

CPC .... B01D 29/00; B01D 29/0093; B01D 33/00; B01D 33/01; B01D 33/333; B01D 33/82; B01D 35/06; B01D 35/30; B01D 35/306; B01D 35/308; B01D 39/14; B01D 39/20; B01D 39/2055; B01D 39/2068; B01D 61/00; B01D 61/002; B01D 61/0022; B01D 61/0024; B01D 63/00; B01D 63/08; B01D 63/081; B01D 63/087; B01D 69/12; B01D 71/00; B01D 71/02; B01D 71/021; B01D 71/0215; B01D 2201/04; B01D 2201/0415; B01D 2201/0461; B01D 2201/20; B01D 2201/28; B01D 2201/30; B01D 2201/301; B01D 2201/323; B01D 2221/06; B01D 2221/12; B01D 2313/08; B01D 2313/208; B01D 46/54; B01D 46/543; B01D 25/1275; B01D 25/176; B01D 25/215; B01D 2053/222; B01D 15/3885; B01D 2265/023; B01D 2311/2607; B01D 39/2065; B01D 61/02; B01D 61/027; B01D 61/08; B01D 61/14; B01D 61/18; B01D 63/06; B01D 69/125; B01D 71/0211; B01D 71/0212; B01D 71/0123; B01D 71/028

See application file for complete search history.

(56) References Cited

FOREIGN PATENT DOCUMENTS

| | | |
|---|---|---|
| CN | 110152503 | 8/2019 |
| CN | 112897643 | 6/2021 |
| CN | 114956060 | 8/2022 |
| DE | 102007019347 | 8/2008 |
| EP | 1354855 | 10/2003 |

OTHER PUBLICATIONS

Lu Juan (2020). Research progress in preparation methods and application fields of graphene. China Energy and Environmental Protection, 42(5), 78-93.

Jafarzadeh, R. , Azamat, J. , & Erfan-Niya, H. . (2020). Water desalination across functionalized silicon carbide nanosheet membranes: insights from molecular simulations. Structural Chemistry, (40).

Thostenson, E. T., Karandikar, P. G., & Chou, T. W. (2005). Fabrication and characterization of reaction bonded silicon carbide/carbon nanotube composites. Journal of Physics D: Applied Physics, 38(21), 3962.

Jeon, H. G., Huh, Y. H., Yun, S. H., Kim, K. W., Lee, S. S., Lim, J., . . . & Park, B. (2014). Improved homogeneity and surface coverage of graphene oxide layers fabricated by horizontal-dip-coating for solution-processable organic semiconducting devices. Journal of Materials Chemistry C, 2(14), 2622-2634.

Zhao, X., Gao, W., Yao, W., Jiang, Y., Xu, Z., & Gao, C. (2017). Ion diffusion-directed assembly approach to ultrafast coating of graphene oxide thick multilayers. ACS nano, 11(10), 9663-9670.

Mei, H., Xia, J., Zhang, D., Han, D., Xiao, S., & Cheng, L. (2017). Highly conductive and high-strength carbon nanotube film reinforced silicon carbide composites. Ceramics International, 43(12), 8873-8878.

* cited by examiner

DESALINATION METHOD OF ION MICRO-NANO SIEVING FOR AGRICULTURAL WATER

CROSS-REFERENCE TO RELATED APPLICATIONS

This disclosure claims priority to Chinese Invention Disclosure No. 202310302717.0, filed on Mar. 24, 2023. The disclosure of the disclosure is incorporated herein for all purposes by reference in its entirety.

TECHNICAL FIELD

The disclosure relates to the field of water purification, in particular to a desalination method of ion micro-nano sieving for agricultural water.

BACKGROUND

The irrigation water source is highly salinized in the main crop producing areas in China, which seriously affects the quality and yield of crops and restricts agricultural development. At present, the water purification technology, with RO (reverse osmosis) membrane and nano-filtration as the core components, has its problems, such as the use of complex equipment, large footprint, expensive purification cost and frequent maintenance in the later stage, which makes it unsuitable for large-scale popularization in agriculture. Therefore, based on the theory of water ion sieving in micro-nano environment of water channel, the technology of the present disclosure provides a method of constructing composite functional materials for micro-nano water channel desalination, achieving excellent effects such as low working pressure, low energy consumption, low cost, high purification rate, low wastewater rate and long service life, which greatly reduce the need of agricultural water purification. Applying such technology can address the problems of soil hardening and plant growth inhibition caused by direct irrigation of saline-alkali water, and can provide technical solutions for solving the desalination supply of agricultural irrigation water in China.

Generally, reverse osmosis technology is used to remove the alkaline anions in seawater. However, reverse osmosis technology needs to provide high pressure through large-scale pressurization equipment such that water molecules reversely permeate into the water-producing layer of the membrane, which requires high pressure resistance of the equipment, and the desalting membrane is subjected to relative pressure during operation, which is easy to damage the desalting membrane, resulting in high cost of seawater purification.

However, the salinization degree of domestic agricultural irrigation water is far lower than that of seawater with a TDS (total dissolved solids) of 1000-3000 mg/L. However, the standard TDS of suitable irrigation water source only needs to meet 100-300 mg/L for soil cultivation and less than 50 mg/L for soilless cultivation. RO technology based on seawater desalination is often used to produce water with a TDS of less than 10 mg/L. Although it has achieved good purification effect, there are some problems in its disclosure in agriculture, such as high desalination cost, large amount of wastewater, unnecessary costs due to excessive purity of produced water, which make it unsuitable for large-scale popularization in agriculture.

SUMMARY

The purpose of the present disclosure is to realize forward desalination, reduce the requirement of equipment on pressure resistance, and protect the desalting membrane from being easily damaged. Compared with the prior art, the present disclosure provides a desalination method of ion micro-nano sieving for agricultural water, which comprises the following steps:

Step one, targeted purification: a desalting membrane with a composite tube cavity structure is formed by carbon nanotubes, graphene oxide and carbon silicide materials; a composite water channel is established through the realization of a targeted passage of water and salt based on ion diameter and charge identification, thus effectively removing anions in saline-alkali water; while organic macromolecules will be trapped on the surface of the water channel, thus realizing the separation of organic matter;

Step two, low-pressure desalination: the desalting membrane with the composite water channel is installed in the desalting main body equipment, and the forward hydrodynamic desalting is realized by constructing the composite water channel. In the traditional technology, the forward osmotic potential of ions needs to be counteracted, so that water molecules reversely permeate into the water-producing layer of the membrane, which requires a large pressurization device to provide a high pressure; however, it is not necessary to build a high-pressure environment to build a composite water channel, which greatly reduces the operating pressure, energy consumption, damage to membrane substrates and scaling. Meanwhile, the compressive performance requirements of equipment are further reduced, and the purification cost is reduced, which is suitable for large-scale popularization in agriculture.

Furthermore, the desalting membrane comprises a composite base membrane and a graphene oxide active layer attached to the outer surface of the composite base membrane, wherein the composite base membrane comprises a plurality of densely arranged tube cavity structures, and the tube cavity structures are constructed by carbon nanotubes and carbon silicide.

Furthermore, the inner diameter of the tube cavity structure is 0.4-0.5 nm, and the tube cavity structure is the established composite water channel.

Furthermore, when desalting, the desalting membrane is first embedded into the protection ring, and then installed into the desalting main body for desalting operation.

Furthermore, a reverse-thrust unmovable plate and a reverse-thrust movable plate are fixedly installed in the protection ring. The desalting membrane, the reverse-thrust movable plate and the reverse-thrust unmovable plate are sequentially arranged along the direction of water flow. A water collecting annular groove is provided at the end of the protection ring close to the desalting membrane, and a plurality of long water diversion holes, which are all communicated with the reverse-thrust movable plate, are provided on the inner wall of the water collecting annular groove. Based on the arrangement of the reverse-thrust movable plate and the reverse-thrust unmovable plate, when water pressure acts on the desalting membrane during the removal of saline-alkali anions in water, under the impact of water, the reverse-thrust unmovable plate generates repulsive force on the reverse-thrust movable plate, which makes the reverse-thrust movable plate move towards the desalting membrane side, thus reducing the deformation amplitude of the desalting membrane under the impact of water, effectively protecting the desalting membrane from being damaged. That is, the deformation of the desalting membrane in this disclosure is smaller than that when the desalting membrane is directly installed in the desalting main body equipment under the same water pressure, thus further protecting the desalting membrane.

In addition, it is noted that the distance between the desalting membrane and the reverse-thrust movable plate is consistent with the axial maximum deformable distance of the desalting membrane, so that when the desalting membrane is deformed under the action of water pressure, the deformation range is always less than the maximum deformable distance, which effectively protects the desalting membrane from being damaged due to excessive deformation.

Furthermore, the reverse-thrust unmovable plate comprises a fixed magnetic plate and a plurality of connecting rods fixedly connected between the outer end of the fixed magnetic plate and the inner wall of the protection ring; the reverse-thrust movable plate comprises a protective sheet and a plurality of elastic tubes fixedly connected between the outer end of the protective sheet and the inner wall of the protection ring; the plurality of elastic tubes respectively corresponds to and communicated with a plurality of long water diversion holes; and the desalting membrane, the protective sheet and the fixed magnetic plate are coaxially arranged, so that the middle part of the fixed magnetic plate, the protective sheet and the desalting membrane correspond to each other. When desalting in the forward direction, the magnetic repulsion force to the reverse-thrust movable plate is not easy to shift, and after the reverse-thrust movable plate is deformed toward the desalting membrane, it can generate a certain force to the middle part of the desalting membrane, effectively restraining its deformation, making the deformation range smaller, properly increasing the water flow rate during desalting, and further accelerating the desalting efficiency.

Furthermore, the protective sheet comprises a variable magnetic layer connected with an elastic tube and an air cushion capsule fixedly connected at the end of the variable magnetic layer near the desalting membrane, and the air cushion capsule is filled with air in a saturated way, so that the air cushion capsule has an elastic sealing structure. As the whole air cushion capsule is elastic, the desalting membranes are in flexible contact when resisting, and the desalting membranes are not easily damaged.

Furthermore, the end of the elastic tube fixedly penetrates through the variable magnetic layer and is flush with the inner wall of the variable magnetic layer, and the mouths of a plurality of elastic tubes located in the variable magnetic layer are fixedly connected with hydrodynamic magnetic blocks, each of which comprises a position control balloon fixedly connected to the mouth of the elastic tube, a hydrodynamic plate fixedly connected to the end of the position control balloon and a position control rope fixedly connected between the hydrodynamic plate and the side wall of the elastic tube, and when there is no water impact, the hydrodynamic plate is located at the mouth of the elastic tube in the variable magnetic layer, and a plurality of hydrodynamic plates are separated from each other, which is not within the range of the fixed magnetic plate, so that the reverse-thrust movable plate is not easy to deform towards the desalting membranes.

Furthermore, when the hydrodynamic plates are located at the elastic nozzle, the position control rope is in a stretched state, so that when there is no water impact, the hydrodynamic plates are relatively stable, and a plurality of hydrodynamic plates are not easy to approach each other; the position control balloon has a flexible sealing structure, and the hydrodynamic plates can be spliced into a complete ring; and when the hydrodynamic plates form a ring, the position control balloon is just in a completely stretched and straight state, so that the position control balloon can limit the movable range of the hydrodynamic plates, and the gap between the corresponding distances between the plurality of hydrodynamic plates 51 and the center of the protective sheet 31 will not be too large, thus effectively ensuring the formation of a complete ring.

Further, when the diameter of the fixed magnetic plate is smaller than that of the protective sheet, and the position control rope is in a straight state, a plurality of hydrodynamic plates are located at the outer side of the fixed magnetic plate, and the mutually close ends of the hydrodynamic plates and the fixed magnetic plate repel each other; during forward desalination, under the action of water flow velocity, part of water is introduced into the long water diversion holes, and a squeezing force is generated on the hydrodynamic plates, so that the hydrodynamic plates are close to each other and form a ring shape; at this time, they are facing the fixed magnetic plate, so that the fixed magnetic plate pushes the middle part of the reverse-thrust movable plate to deform towards the desalting membrane, thereby effectively restraining the deformation amplitude of the desalting membrane under the action of water flow and effectively improving the protection of the desalting membrane.

Compared with the prior art, the disclosure has the advantages: by constructing a desalting membrane with a composite water channel, and identifying the ion diameter and charge, combined with fluid dynamics and micro-nano flow theory, the targeted passage of water and salt can be realized, and cations such as sodium, calcium, magnesium, and anions such as chlorine, sulfate, bicarbonate, etc. in saline-alkali water can be effectively removed, so as to achieve forward hydrodynamic desalination. Compared with the traditional reverse osmosis technology, this technology does not need to provide a high pressure to offset the forward osmotic potential of ions through large pressurization equipment, so as to reversely permeate water molecules into water-producing layer of the membrane. It can greatly reduce the operating pressure, reduce the damage and scaling on the membrane substrate, further reduce the requirements of the compressive performance of the equipment, reduce the purification cost, and be suitable for large-scale popularization in agriculture.

In which:

1 protection ring;
11 water collecting annular groove;
12 long water diversion holes;
2 desalting membrane;
3 reverse-thrust movable plate;
31 protective sheet;
311 variable magnetic layer;
312 air cushion capsule;
32 elastic tube;
41 fixed magnetic plate;
42 connecting rod;
51 hydrodynamic plate;
52 position control balloon;
53 position control rope.

DETAILED DESCRIPTION

The technical schemes in the embodiments of this disclosure will be described clearly and completely with the attached drawings. Obviously, the described embodiments are only a part of the embodiments of this disclosure, but not all the embodiments. Based on the embodiments of this disclosure, all other embodiments, obtained by those skilled in the art without paying creative labors, will fall into the scope of protection of this disclosure.

EXAMPLES

Example 1

Figure 1:
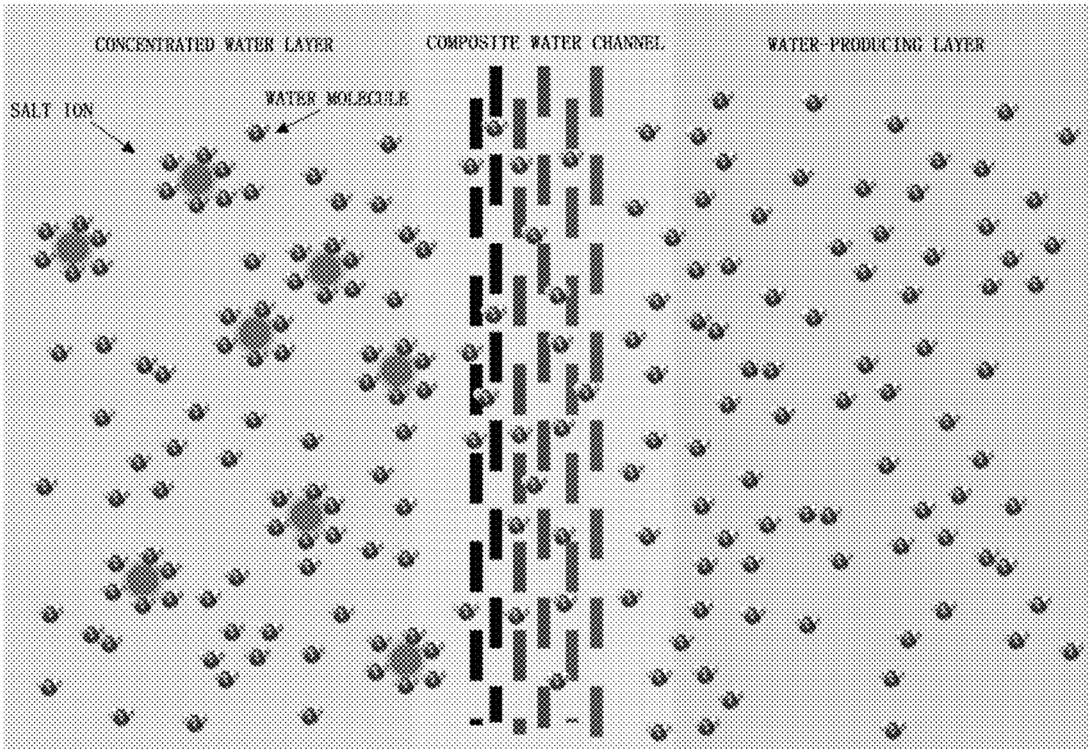
FIG. 1 is a schematic diagram of the transfer of water molecules and salt ions on a composite water channel according to the present disclosure.
Figure 2:
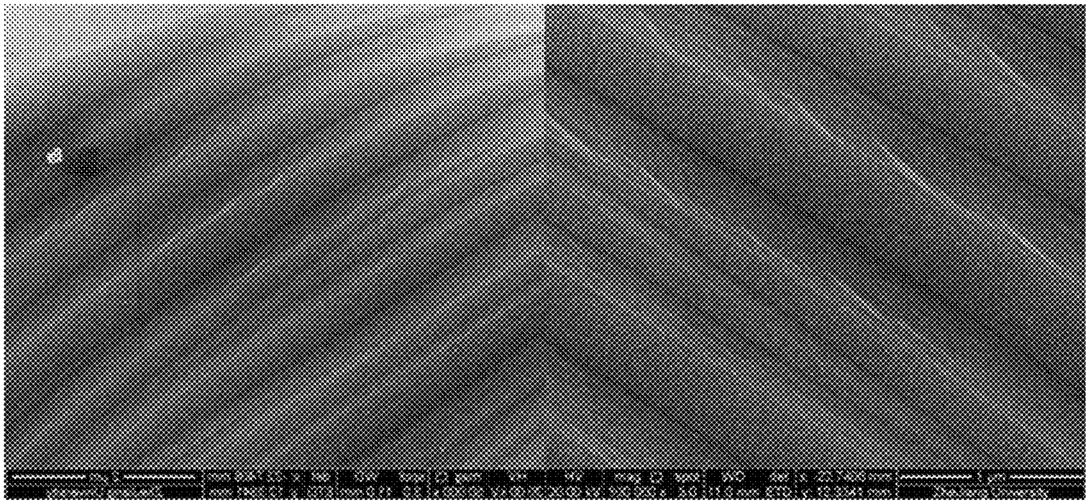
FIG. 2 is a schematic diagram of the microstructure of the composite water channel according to the present disclosure.

The disclosure discloses a desalination method of ion micro-nano sieving for agricultural water. Referring to FIGS. 1-2, the method includes the following steps:

Step one—targeted purification: a desalting membrane 2 with a multi-tube-cavity structure is formed by carbon nanotubes (CNTs), graphene oxide (GO), carbon silicide (SiC) and other materials, the inner diameter of the multi-cavity structure is 0.4-0.5 nm, and the multi-cavity structure is a composite water channel. Through the identification of ion diameter and charge, combined with the micro-nano flow theory of fluid dynamics, the targeted passage of water and salt is realized, and cations such as sodium, calcium and magnesium, anions such as chlorine, sulfate and bicarbonate in saline-alkali water are effectively removed. Meanwhile, organic macromolecules will be trapped on the surface of the water channel, thus realizing the separation of organic matter; and by adjusting the charge ratio, some ions (e.g. $Ca^{2+}$, $Mg^{2+}$) for crop growth can escape in a targeted way, thus improving the nutrient utilization rate;

Step two—low-pressure desalination: forward hydrodynamic desalination is realized by constructing the composite water channel. Compared with the traditional reverse osmosis technology, this technology does not need the reverse osmosis of water molecules into the water-producing layer of the membrane (by virtue of the high pressure formed by large booster equipment), and at the same time counteracts the forward osmosis potential of ions. The disclosure greatly reduces the operating pressure, reduces the damage and scaling to the membrane substrate, further reduces the requirements of the compression resistance of the equipment, reduces the purification cost, and is suitable for large-scale popularization in agriculture.

The desalting membrane 2 comprises a composite base membrane and a graphene oxide active layer attached to the outer surface of the composite base membrane, wherein the composite base membrane comprises a plurality of densely arranged tube cavity structures, and the tube cavity structures are constructed of carbon nanotubes and carbon silicide.

By constructing a desalting membrane with a composite water channel, through the identification of ion diameter and charge, combined with fluid dynamics and micro-nano flow theory, the targeted passage of water and salt can be realized, and cations such as sodium, calcium, magnesium, and anions such as chlorine, sulfate, and bicarbonate in saline-alkali water can be effectively removed, so as to achieve forward hydrodynamic desalting. Compared with the traditional reverse osmosis technology, this technology does not need to provide high pressure through large pressurization equipment to offset the forward osmotic potential of ions, so as to reversely permeate water molecules into the water-producing layer of the membrane. It can greatly reduce the operating pressure, reduce the damage and scaling on the membrane substrate, further reduce the requirements of the compression performance of the equipment, reduce the purification cost, and be suitable for large-scale popularization in agriculture.

Example 2

Figure 3:
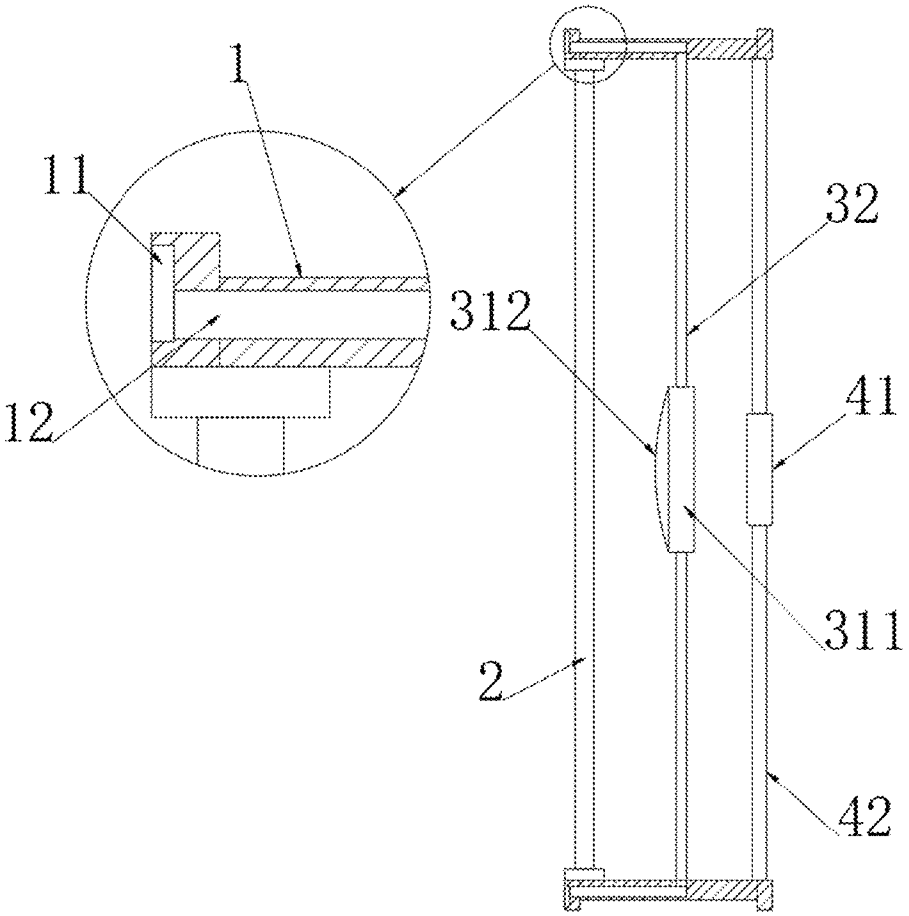
FIG. 3 is a schematic structural view of the cross section of the desalting membrane when it is installed in the protection ring according to the present disclosure.
Figure 4:
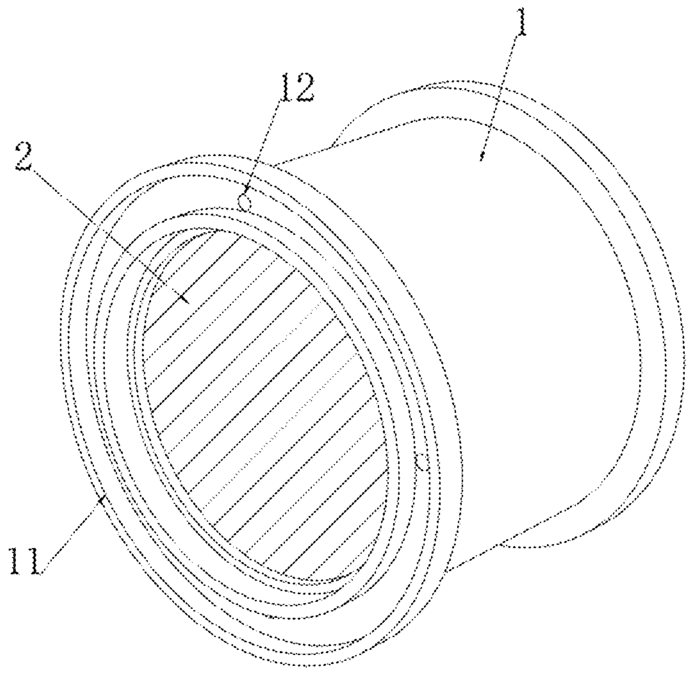
FIG. 4 is a schematic diagram of the three-dimensional structure on the left side when the desalting membrane is installed in the protection ring according to the present disclosure.
Figure 5:
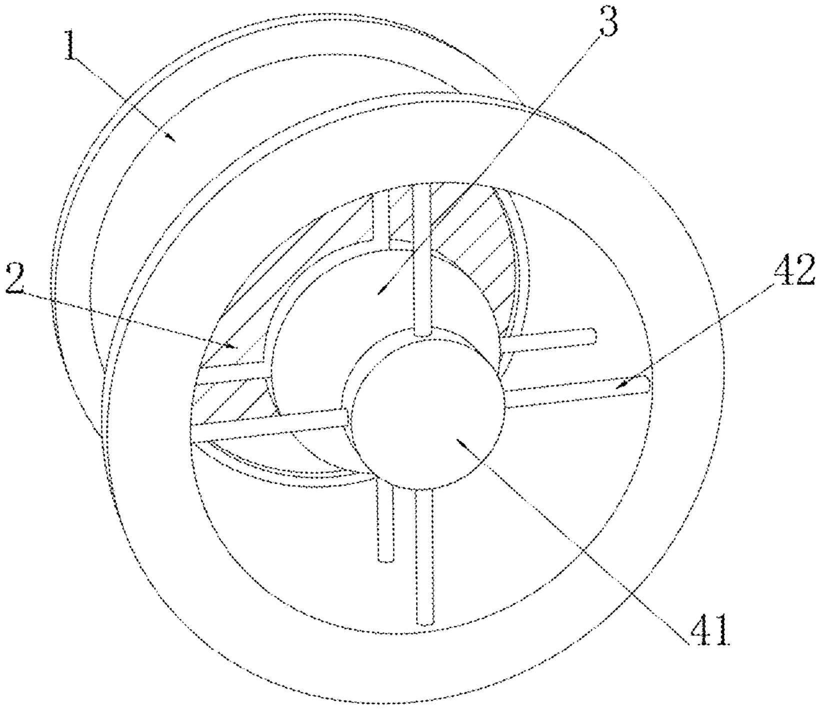
FIG. 5 is a schematic view of the three-dimensional structure from the right side when the desalting membrane is installed in the protection ring according to the present disclosure.

Referring to FIGS. 3-4, in the course of desalting, the desalting membrane 2 is first embedded into a protection ring 1, and then installed into the desalting main body for desalting operation. As shown in FIG. 5, a reverse-thrust unmovable plate and a reverse-thrust movable plate 3 are also fixedly installed in the protection ring 1. The desalting membrane 2, the reverse-thrust movable plate 3 and the reverse-thrust unmovable plate are arranged in sequence along the direction of water flow.

Figure 6:
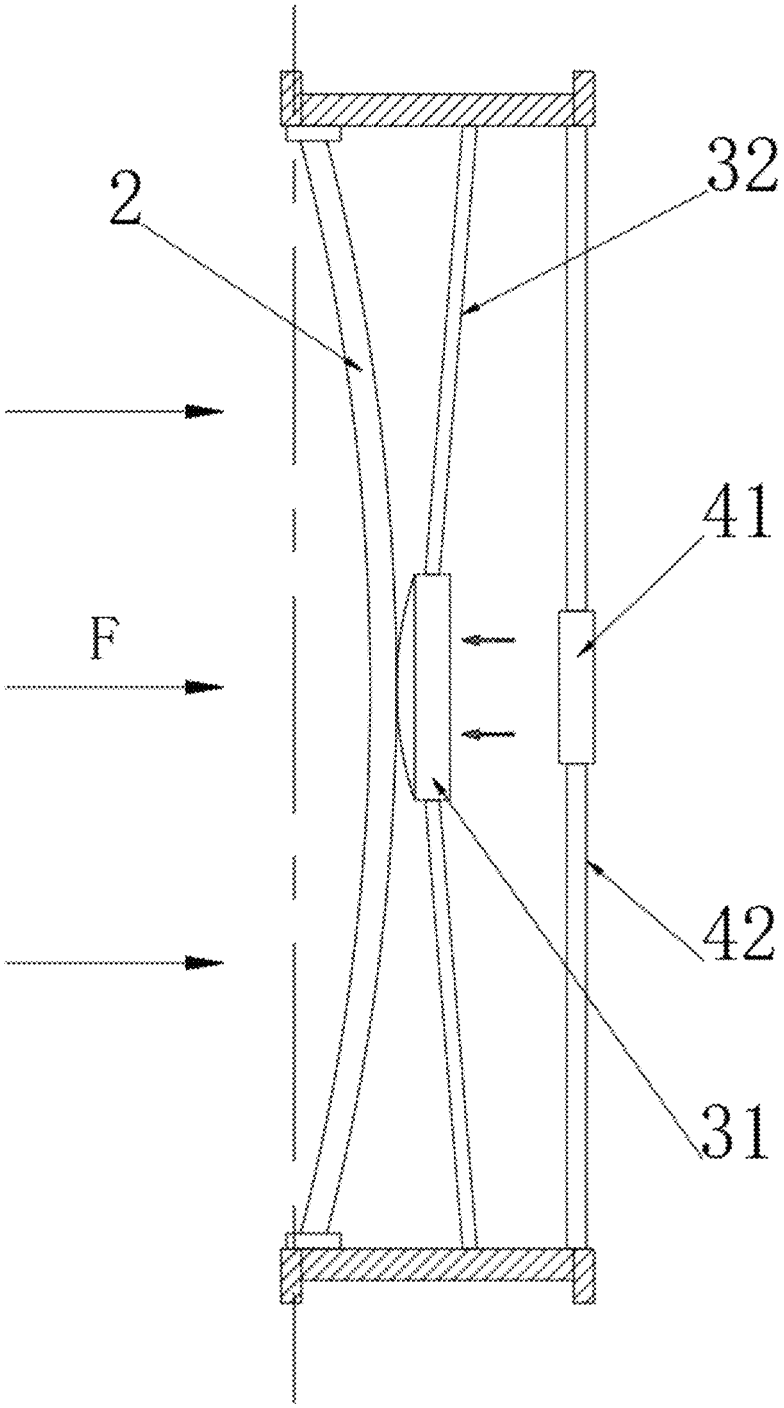
FIG. 6 is a schematic structural diagram of the desalting membrane when it is deformed under the action of water pressure according to the present disclosure.
Figure 7:
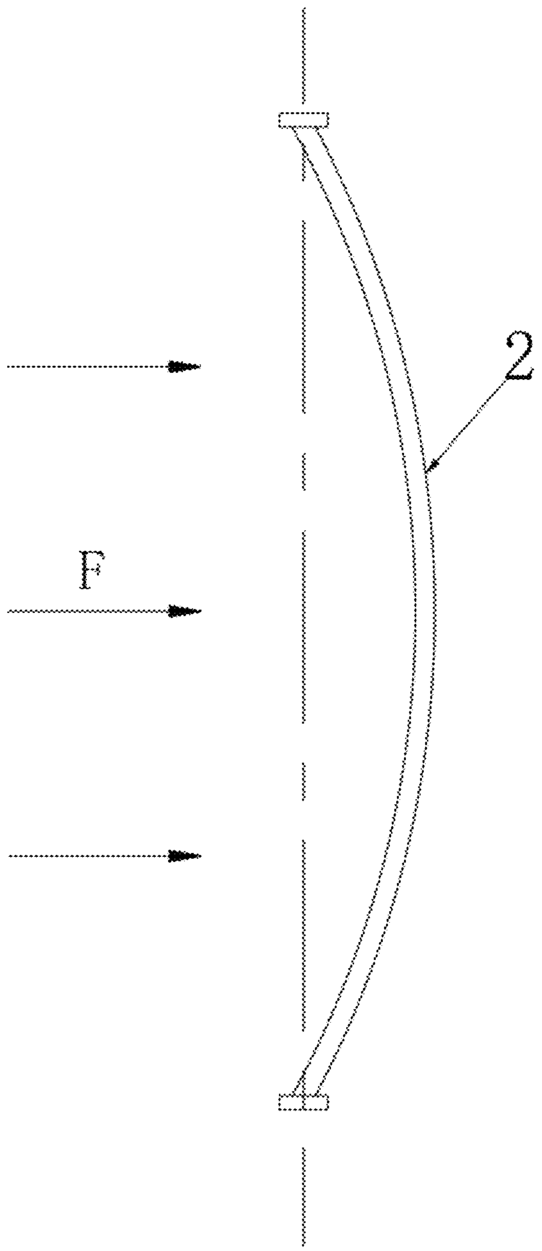
FIG. 7 is a schematic structural diagram of the desalting membrane when it is directly installed in the desalting main body equipment due to water pressure deformation according to the present disclosure.

The end of the protection ring 1 near the desalting membrane 2 is provided with a water collecting annular groove 11, and the inner wall of the water collecting annular groove 11 is provided with a plurality of long water diversion holes 12, all of which are communicated with the reverse-thrust movable plate 3. With the arrangement of the reverse-thrust movable plate 3 and reverse-thrust unmovable plate, when water pressure acts on the desalting membrane 2 during the removal of saline-alkali anions in water, under the impact of water, the reverse-thrust unmovable plate generates repulsive force on the reverse-thrust movable plate 3, so that the reverse-thrust movable plate 3 moves towards a side of the desalting membrane 2. Hence, the deformation amplitude of the desalting membrane 2 under the impact of water is reduced, which effectively protects the desalting membrane 2 from damage. As shown in FIGS. 6-7, under the same water pressure, the deformation amount of the desalting membrane 2 in this disclosure is smaller than that when the desalting membrane 2 is directly installed in the desalting main body equipment, which further protects the desalting membrane 2.

In addition, it is worth noting that the distance between the desalting membrane 2 and the reverse-thrust movable plate 3 is consistent with the axial maximum deformable distance of the desalting membrane 2, so that when the desalting membrane 2 is deformed under the action of water pressure, the deformation range is always less than the maximum deformable distance, effectively protecting the desalting membrane 2 from being damaged due to excessive deformation.

The reverse-thrust unmovable plate comprises a fixed magnetic plate 41 and a plurality of connecting rods 42 fixedly connected between the periphery of the fixed magnetic plate 41 and the inner wall of the protection ring 1; the reverse-thrust movable plate 3 comprises a protective sheet 31 and a plurality of elastic tubes 32 fixedly connected between the periphery of the protective sheet 31 and the inner wall of the protection ring 1; the plurality of the elastic tubes 32 correspond to and communicate with the plurality of long water diversion holes 12 respectively; and the desalting membrane 2, the protective sheet 31 and the fixed magnetic plate 41 are coaxially arranged, so that the middle portions of the fixed magnetic plate 41, the protective sheet 31 and the desalting membrane 2 are correspond to each other; as shown in FIG. 6, during forward desalination, the magnetic repulsion force of the fixed magnetic plate 41 to the reverse-thrust movable plate 3 is not easy to shift, and after the reverse-thrust movable plate 3 is deformed towards the desalting membrane 2, it can generate a certain force on the middle portion of the desalting membrane 2 to effectively restrain its deformation and make the deformation range smaller, which appropriately increase the water flow rate during desalting, thus accelerating the desalting efficiency.

The protective sheet 31 includes a variable magnetic layer 311 connected with elastic tubes 32 and an air cushion capsule 312 fixedly connected to an end of the variable magnetic layer 311 proximate to the desalting membrane 2. The air cushion capsule 312 is saturated with air, and the air cushion capsule 312 is of an elastic sealing structure. As the air cushion capsule 312 is elastic as a whole, it is in flexible contact with the desalting membrane 2 when generating resistance to the desalting membrane 2, which is not easy to cause excessive damage to the desalting membrane 2.

Figure 8:
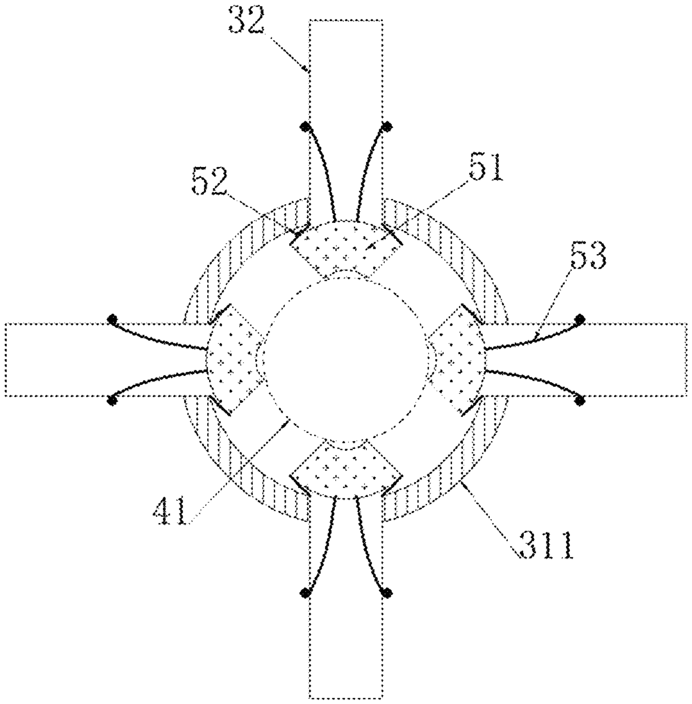
FIG. 8 is a structural schematic diagram of the cross section of the reverse-thrust movable plate according to the present disclosure.

As shown in FIG. 8, the ends of the elastic tubes 32 fixedly penetrate through the variable magnetic layer 311 and are flush with the inner wall of the variable magnetic layer 311, and hydrodynamic magnetic blocks are provided at openings of the variable magnetic layer 311 through which the plurality of elastic tubes 32 extend, the hydrodynamic magnetic block comprises a position control balloon 52 fixedly connected to the opening of the elastic tubes 32, a hydrodynamic plate 51 fixedly connected to the end of the position control balloon 52 and a position control rope 53 fixedly connected between the hydrodynamic plate 51 and the side wall of the elastic tubes 32. The hydrodynamic plate 51, when there is no water impact, is located at the opening of the variable magnetic layer 311 where the elastic tube 32 positions, and the plurality of hydrodynamic plates 51 are separated from each other, and are not within the range where the fixed magnetic plate 41 is facing, so that the reverse-thrust movable plate 3 is not easy to deform toward the desalting membrane 2. When the hydrodynamic plate 51 is located at the mouth of the elastic tube 32, the position control rope 53 is in a stretched state, so that when there is no water impact, the hydrodynamic plates 51 are relatively stable and the plurality of the hydrodynamic plates 51 are not easy to approach each other.

Figure 9:
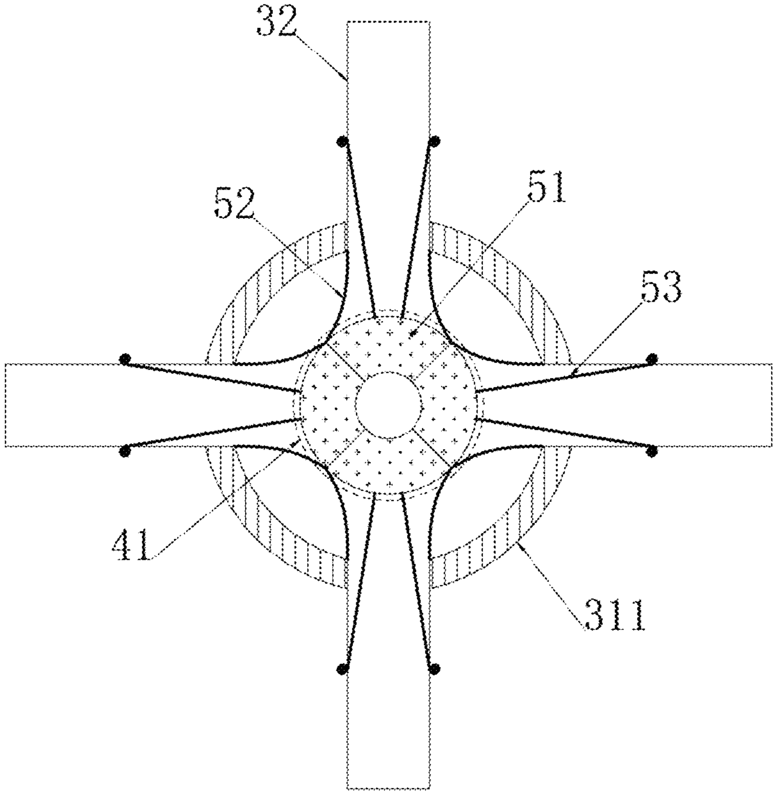
FIG. 9 is a schematic structural diagram when the hydrodynamic plates in the reverse-thrust movable plate are mutually enclosed in a ring shape according to the present disclosure.

Referring to FIG. 9, the position control balloon 52 is a flexible sealing structure, and a plurality of hydrodynamic plates 51 can be spliced as a complete ring, and when the hydrodynamic plates 51 form a ring, the position control balloon 52 is just in a completely stretched state, so that the position control balloon 52 can limit the movable range of the hydrodynamic plates 51, and the gap between the corresponding distances between the plurality of hydrodynamic plates 51 and the center of the protective sheet 31 will not be too large, thus effectively ensuring the formation of the complete ring. When the diameter of the fixed magnetic plate 41 is smaller than that of the protective sheet 31, and the position control rope 53 is in a straight state, a plurality of hydrodynamic plates 51 are located outside the fixed magnetic plate 41, and the ends of the hydrodynamic plates 51 and the fixed magnetic plate 41 that are close to each other repel each other. During forward desalination, under the action of water flow velocity, part of the water is introduced into the long water diversion holes 12, and a squeezing force is generated on the hydrodynamic plates 51, so that the hydrodynamic plates 51 are close to each other and form a ring; at this time, they are facing the fixed magnetic plate 41, so that the fixed magnetic plate 41 pushes the middle part of the reverse-thrust movable plate 3 such that it deforms towards the desalting membrane 2, thereby effectively restraining the deformation amplitude of the desalting membrane 2 under the action of water flow and effectively improving the protection of the desalting membrane 2.

Based on embodiment 1, this embodiment adds a related protection structure for the desalting membrane 2. Under the specific arrangement of the above structure, compared with embodiment 1 in which the desalting membrane 2 is directly installed on desalting main body equipment, the deformation of desalting membrane 2 in this embodiment is smaller under the condition of the same water flow speed and the same water pressure, which greatly reduces the damage to desalting membrane 2 due to water pressure; meanwhile, within the deformation range of the desalting membrane 2, the water flow speed during desalting may be appropriately increased, thereby accelerating the desalting efficiency.

The above-mentioned embodiments are only preferred embodiments for fully explaining the present disclosure, and the protection scope of the present disclosure is not limited thereto. Equivalent substitutions or alterations made by those skilled in the art on the basis of the present disclosure are all within the protection scope of the present disclosure.

What is claimed is:

1. A desalination method of ion micro-nano sieving for agricultural water, comprising the following steps:

providing a desalting membrane comprising:

a composite base membrane manufactured with carbon nanotubes and carbon silicide, the carbon nanotubes providing tube cavity structures, and a graphene oxide active layer attached to the outer surface of the composite base membrane;

installing the desalting membrane to a desalting main equipment; and flowing saline-alkali water through an inner surface of the desalting main equipment away from the graphene oxide active layer, wherein the graphene oxide active layer, based on diameter and charge identification, effectively removes anions in saline-alkali water and entraps organic macromolecules on a surface of the tube cavity structures, wherein the desalting membrane is embedded into a protection ring prior to installing into the desalting main body equipment, and wherein a reverse-thrust unmovable plate and a reverse-thrust movable plate are integrally installed in the protection ring, the desalting membrane, the reverse-thrust movable plate and the reverse-thrust unmovable plate are sequentially arranged along the direction of water flow, and a water collecting annular groove is provided at an end of the protection ring proximate to the desalting membrane, and a plurality of elongated water diversion holes, which are all communicated with the reverse-thrust movable plate, are provided on an inner wall of the water collecting annular groove.

2. The desalination method of ion micro-nano sieving for agricultural water according to claim 1, wherein an inner diameter of the tube cavity structure is 0.4 to 0.5 nanometers.

3. The desalination method of ion micro-nano sieving for agricultural water according to claim 1, wherein the reverse-thrust unmovable plate comprises a fixed magnetic plate and a plurality of connecting rods integrally connected between a periphery of the fixed magnetic plate and an inner wall of the protection ring; the reverse-thrust movable plate comprises a protective sheet and a plurality of elastic tubes integrally connected between a periphery of the protective sheet and the inner wall of the protection ring; the plurality of elastic tubes respectively corresponds to and in fluid communication with the plurality of elongated water diversion holes; and the desalting membrane, the protective sheet and the fixed magnetic plate are coaxially arranged.

4. The desalination method of ion micro-nano sieving for agricultural water according to claim 3, wherein the protective sheet comprises a variable magnetic layer connected with the elastic tubes and an air cushion capsule integrally connected at an end of the variable magnetic layer proximate to the desalting membrane, and the air cushion capsule is filled up with air, and the air cushion capsule is elastically sealed.

5. The desalination method of ion micro-nano sieving for agricultural water according to claim 4, wherein an end of the elastic tubes is integrated with and penetrates through the variable magnetic layer and is flush with an inner wall of the variable magnetic layer, and the mouths of the plurality of elastic tubes located in the variable magnetic layer are integrally connected with hydrodynamic magnetic blocks each comprising a position control balloon integrally connected to a mouth of the elastic tubes, a hydrodynamic plate integrally connected to an end of the position control balloon and a position control rope integrally connected between the hydrodynamic plate and a side wall of the elastic tubes.

6. The desalination method of ion micro-nano sieving for agricultural water according to claim 5, wherein the position control balloon is flexibly sealed, when the hydrodynamic plate is located at the mouth of the elastic tubes, the position control rope is in a stretched state; the hydrodynamic plate can be spliced into a complete ring; and when the hydrodynamic plate forms the ring, the position control balloon is just in a completely stretched state.

7. The desalination method of ion micro-nano sieving for agricultural water according to claim 6, wherein a diameter of the fixed magnetic plate is smaller than a diameter of the protective sheet, and when the position control rope is in a stretched state, a plurality of hydrodynamic plates are located outside the fixed magnetic plate, and ends of the hydrodynamic plate and the fixed magnetic plate that are adjacent to each other repel each other.

* * * * *